May 17, 1932.　　A. S. FITZ GERALD ET AL　　1,859,082
CIRCUIT INTERRUPTER
Original Filed May 23, 1927
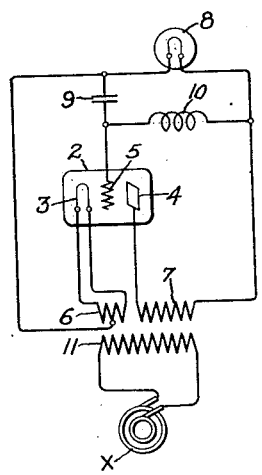
Inventors:
Alan S. FitzGerald
Harry L. Palmer
by 　*Alexander S. Lurie*,
Their Attorney Patented May 17, 1932

1,859,082

UNITED STATES PATENT OFFICE

ALAN S. FITZ GERALD, OF SCHENECTADY, AND HARRY L. PALMER, OF SCOTIA, NEW YORK, ASSIGNORS TO GENERAL ELECTRIC COMPANY, A CORPORATION OF NEW YORK

CIRCUIT INTERRUPTER

Application filed May 23, 1927, Serial No. 193,428. Renewed September 14, 1931.

Our invention relates to electric circuits for producing periodic current and more particularly to such circuits utilizing an electric valve for producing intermittent current impulses.

Heretofore there have been devised numerous arrangements for producing periodic currents such as are useful, for example, in connection with the operation of flashing signs, advertising devices, traffic signals, and the like. Certain of these arrangements of the prior art have involved the use of contacts, relays, or other moving parts having well known disadvantages. Other arrangements of the prior art utilizing electric valves have been subject to decided frequency limitations.

It is an object of our invention, therefore, to provide an improved electric translating circuit, including an electric valve, which will overcome the above mentioned disadvantages of the arrangements of the prior art, and which will be simple and reliable in operation.

It is a further object of our invention to provide an improved electric translating circuit, including an electric valve, for producing a periodic current which will operate satisfactorily at any desired frequency within wide limits of frequency variation.

In accordance with our invention we provide a capacitor having a charging circuit and a discharging circuit. An electric valve provided with a control element is included in one of these circuits, while the other comprises a non-emissive conductive path including an impedance for charging or discharging the capacitor at a predetermined rate. The control element of the electric valve is energized in response to the charge on the capacitor so that the valve may be rendered conducting to transfer current from one circuit to the other when the capacitor has reached a predetermined state of charge. The load circuit may be associated with any of the several circuit components although we prefer to connect it across the capacitor and its associated impedance.

For a better understanding of our invention, together with other and further objects thereof, reference is had to the following description taken in connection with the accompanying drawing, and its scope will be pointed out in the appended claims. The single figure of the accompanying drawing illustrates an embodiment of our invention for intermittently energizing a lamp from a source of alternating current.

Referring now to the single figure of the drawing, there is illustrated an arrangement for receiving energy from an alternating current generator X and converting it into periodic current impulses from which a load device, such for example as a lamp 8, may be energized. This apparatus comprises a capacitor 9 adapted to be charged through a circuit, including a reactor 10, an electric valve 2, and the secondary winding 7 of a transformer, the primary winding 11 of which is connected to the generator X. The electric valve 2 comprises a filament 3 adapted to be energized from the secondary winding 6 of the transformer, an anode 4, and a control grid 5 interposed between said anode and cathode for controlling the current flowing in the valve circuit. Electric valve 2 may be of any of the several types well known in the art, although we prefer to use a valve of the vapor electric discharge type in which the control grid is effective only to control the starting of the current in the cathode-anode circuit of the valve. A non-emissive conductive path including the reactor 10 is provided for discharging the capacitor 9. By the term "non-emissive conductive path" we refer to one in which current may traverse the complete circuit by the ordinary phenomenon of conduction as distinguished from conduction through an electric valve, which includes electronic emission from an electrode to a gaseous space or vacuum. The load device, or lamp 8, may be associated with any of the several circuit elements, although we prefer to connect it in parallel to the capacitor 9 and reactor 10 so that it is included directly in the anode-cathode circuit of electric valve 2 and in the discharge circuit of capacitor 9.

In explaining the operation of the above described apparatus, it will be assumed that capacitor 9 is initially completely discharged so that the grid of the valve 2 is at cathode potential and that the transformer comprising the windings 6, 7, and 11 is energized from the generator X. Since the grid and cathode of the valve 2 are at the same potential, the valve 2 will be rendered conductive and the current will flow through the winding 7, the load device 8 and the cathode-anode circuit of the valve 2, energizing the lamp 8. The parallel circuit including capacitor 9 and reactor 10 is also included in the anode-cathode circuit of the valve 2 in series with the transformer winding 7 so that capacitor 9 will tend to become charged through electric valve 2 operating as a half wave rectifier. As the capacitor 9 becomes charged it will be noted that the terminal of the capacitor 9 to which the grid 5 is connected, is negative with respect to the terminal of the capacitor connected to the cathode of the valve and, when this capacitor has become charged to a predetermined potential, the grid 5 becomes sufficiently negative to render the valve 2 non-conductive thus interrupting the current to the load device 8. Capacitor 9 now slowly discharges through the reactor 10 and the load device 8, the rate of discharge being determined by the impedance of these two devices. When the load device 8 is a lamp, as illustrated, the impedance of this discharge circuit of the capacitor should be sufficiently high to prevent the discharge current of capacitor 9 from illuminating the lamp. As the capacitor 9 discharges, the potential of the terminal connected to the grid 5 decreases negatively until it reaches such a value that the valve 2 is again made conductive. The above described cycle is repeated indefinitely and intermittent current impulses are supplied to the load device 8 of a frequency dependent upon the size of the capacitor 9 and the impedance of the reactor 10 and load device 8. Obviously, therefore, the frequency of the intermittent current impulses can be varied by properly varying the capacitor 9 or reactor 10.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is,—

1. A circuit interrupter comprising a thermionic rectifying device including a filament, a grid and a plate, a source of energy for heating the filament for producing electronic emission, a source of alternating current having one terminal connected to the plate and the other terminal connected to a current consuming device, the other terminal of the said device being connected to the filament element, a condenser interposed between the said grid and the conductor connecting the said device with the said filament element, and an impedance element shunting said condenser and said device.

2. A circuit interrupter comprising a thermionic rectifying device comprising in turn a filament, a grid and a plate, a source of energy for heating the filament for producing thermionic emission, a source of current having one terminal connected to the plate and the other connected to the filament through a current consuming device, a shunt circuit across said current consuming device comprising a condenser, said grid being connected to said condenser whereby the latter is alternately charged and discharged and the operation of the thermionic device accordingly suppressed and restored to cause the current consuming device to operate periodically.

3. A circuit interrupter comprising a thermionic rectifying device comprising in turn a filament, a grid and a plate, a source of energy for heating the filament for producing thermionic emission, a source of current having one terminal connected to the plate and the other connected to the filament through a current consuming device, a shunt circuit across said current consuming device comprising a condenser, said grid being connected to said shunt whereby the operation of the thermionic device is periodically suppressed and restored to cause the current consuming device to operate periodically, and a resistance element connected in series with said condenser in said shunt.

4. A circuit interrupter comprising a thermionic rectifying device comprising in turn a filament, a grid and a plate, a source of energy for heating the filament for producing thermionic emission, a source of current having one terminal connected to the plate and the other connected to the filament through a current consuming device, a shunt circuit across said current consuming device comprising a condenser, said grid being connected to said shunt whereby the operation of the thermionic device is periodically suppressed and restored to cause the current consuming device to operate periodically, and a resistance element connected in series with said condenser in said shunt, said grid being connected to said shunt at a point between the condenser and the resistance.

5. In combination with a thermionic tube comprising a filament, a plate and a grid element, a source of alternating current and a current operated device connected in series, the series connection being located across the plate and filament, a bridge connected across the terminals of said current operated device, said bridge comprising a condenser and a reactance connected in series, said grid element being connected to said bridge at a point between the condenser and the reactance.

6. In combination with a thermionic tube comprising a filament, a plate, and a grid element, a source of current connected to said filament for heating the latter, another source of current and a current consuming device connected in series between the filament and the plate, a bridge across said current operated device comprising a condenser and a resistance in series, said grid element being connected to said shunt between said condenser and said resistance whereby the condenser may be periodically charged and slowly discharged and whereby the said device may be correspondingly periodically operated.

7. In combination with a thermionic tube comprising a filament, a plate, and a grid element, a source of current connected to said filament for heating the latter, another source of current and a current consuming device connected in series between the filament and the plate, a condenser interposed between said grid and said last series connection whereby the condenser may be charged from said source, and a reactance connected across said current consuming device and said condenser and being adapted to discharge the condenser at a slower rate than the rate of charge.

8. In combination with a thermionic tube comprising a filament, a plate and a grid, a source of current connected to said filament whereby said filament is heated, another source of electric energy and a current consuming device connected in series with said plate and said filament whereby said thermionic tube operates as a rectifying device and allows current to be supplied to said current consuming device in one direction, a condenser having one pole connected between said current consuming device and said filament and another pole connected to said grid whereby said grid is charged in terms of potential energy existing in said current consuming supply circuit and interrupts the flow of electric energy through said thermionic tube, an impedance connected across said condenser and said current consuming device whereby said condenser is discharged over said current consuming device and said impedance and causes a corresponding decrease of the grid potential to again permit flow of electric energy through said thermionic tube.

9. Apparatus for generating a periodic current comprising a source of current, a capacitor, a circuit for charging said capacitor from said source, a circuit for discharging said capacitor, one of said circuits including an electric valve provided with a control element and the other of said circuits comprising a non-emissive conducting path and means for impressing a negative potential on said control element for a predetermined portion of the cycle of periodic current to render said valve non-conducting.

10. Apparatus for generating a periodic current comprising a source of current, a capacitor, a circuit for charging said capacitor from said source, a circuit for discharging said capacitor, one of said circuits including an electric valve provided with an anode, a cathode, and a control grid and the other of said circuits comprising a non-emissive conductive path, and a connection from said grid to a point in one of said circuits which is negative with respect to said cathode for a predetermined portion of the cycle of periodic current to render said valve non-conducting.

11. Apparatus for generating a periodic current comprising a source of current, a capacitor, a circuit for charging said capacitor from said source, a circuit for discharging said capacitor, one of said circuits including an electric valve, and the other of said circuits comprising a non-emissive conductive path including a relatively high resistance, and means for controlling the conductivity of said valve in accordance with the charge of said condenser.

12. Apparatus for generating a periodic current comprising a source of current, a single electric valve, a capacitor, a circuit for charging said capacitor from said source including said valve, a discharging circuit for said capacitor comprising a non-emissive conducting path, and means for maintaining said valve non-conducting during the discharge of said capacitor.

13. Apparatus for generating a periodic current comprising a source of current, a single electric valve, a capacitor, a circuit including said valve for charging said capacitor from said source, a circuit for discharging said capacitor comprising a non-emissive conductive path, means for interrupting the current in said valve when said capacitor becomes substantially completely charged, and means for initiating a charging current through said valve when said capacitor becomes discharged to a predetermined degree.

14. Apparatus for generating a periodic current comprising a source of current, a capacitor, a circuit for charging said capacitor from said source, a circuit for discharging said capacitor comprising a non-emissive conductive path, a single electric valve provided with a control element, said valve being included in said charging circuit, means for interrupting the current in said valve when said capacitor becomes substantially completely charged, and means for maintaining a negative potential on said control element to render said valve non-conducting until said capacitor becomes substantially discharged.

In witness whereof, we have hereunto set our hands this 20th day of May, 1927.

ALAN S. FITZ GERALD.
HARRY L. PALMER.